(12) United States Patent
Böhnke

(10) Patent No.: US 6,535,501 B1
(45) Date of Patent: Mar. 18, 2003

(54) TRANSMISSION METHOD AND TRANSMISSION APPARATUS FOR TRANSMITTING SIGNALS ON THE BASIS OF A OFDM/TDMA-SYSTEM IN A GSM/ SYSTEM

(75) Inventor: Ralf Böhnke, Esslingen (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/187,109

(22) Filed: Nov. 5, 1998

(30) Foreign Application Priority Data

Nov. 7, 1997 (EP) .............................. 97119549

(51) Int. Cl.$^7$ .................................. H04J 3/00
(52) U.S. Cl. ...................................... 370/345
(58) Field of Search ................. 370/203, 206, 370/310, 319–321, 328–330, 336–337, 345, 347, 343–344; 375/130, 146, 295

(56) References Cited

U.S. PATENT DOCUMENTS

| | | | | |
|---|---|---|---|---|
| 5,282,222 A | * | 1/1994 | Fattouche et al. | 375/260 |
| 6,058,118 A | * | 5/2000 | Rault et al. | 370/464 |
| 6,175,550 B1 | * | 1/2001 | van Nee | 370/206 |
| 6,188,717 B1 | * | 2/2001 | Kaiser et al. | 375/148 |

FOREIGN PATENT DOCUMENTS

| | | |
|---|---|---|
| EP | 562 868 A2 | 9/1993 |
| EP | 0 752 779 A2 | 1/1997 |
| EP | 0 760 564 A2 | 3/1997 |
| EP | 0 786 890 A2 | 7/1997 |
| EP | 0 810 746 A2 | 12/1997 |
| EP | 0 825 741 A2 | 2/1998 |
| WO | WO 97/01256 | 1/1997 |

OTHER PUBLICATIONS

Larsson et al.: "Mixed traffic in multi carrier system", 1996 IEEE Vehicular Technology Conference, Apr. 28, 1996—May 1, 1996, New York, US, pp. 1259–1263, XP000593147.

* cited by examiner

*Primary Examiner*—Dang Ton
*Assistant Examiner*—Kevin C. Harper
(74) *Attorney, Agent, or Firm*—Frommer Lawrence & Haug LLP; William S. Frommer

(57) ABSTRACT

A transmission technique for transmitting signals on the basis of an OFDM/TDMA-system, wherein a plurality of subcarriers that are orthogonal to each other are allocated to a variable number of channels, each channel containing a variable number of subcarriers depending On the information to be transmitted. For transmission in a GSM-system having a constant number of predetermined GSM-frequency channels and a constant number of predetermined GSM-timeslots being grouped in GSM-frames, the number of subcarriers allocated to each of the GSM-frequency channels is such that a multiple of the resulting OFDM/TDMA-timeslot matches with one (or a multiple of One) GSM-timeslot.

18 Claims, 6 Drawing Sheets

TRANSMISSION METHOD AND TRANSMISSION APPARATUS FOR TRANSMITTING SIGNALS ON THE BASIS OF A OFDM/TDMA-SYSTEM IN A GSM/ SYSTEM

The present invention relates to a transmission method and apparatus for transmitting signals in accordance with the OFDM/TDMA-system.

BACKGROUND OF THE INVENTION

In the OFDM/TDMA-system as shown in FIGS. 1–4, a plurality of subcarriers 1, which are orthogonal to each other, can be allocated to a variable number of channels $U_0$, $U_1 \ldots U_9$, each channel $U_0$, $U_1 \ldots U_9$ containing a variable number of subcarriers 1 depending on the information to be transmitted. FIG. 1 shows a group of ten frequency channels $U_0$, $U_1 \ldots U_9$. Each frequency channel $U_0$, $U_1 \ldots U_9$ can contain a variable number of subcarriers depending on the information to be transmitted, as shown for the channels $U_0$ and $U_1$ in FIG. 2. The channel $U_0$ contains a plurality of subcarriers 1, and the channel $U_1$ contains a number of subcarriers different from channel $U_0$. The number of subcarriers 1 allocated in each channel depends on the amount of information to be transmitted. The channel $U_0$ shown in FIG. 2 contains 21 subcarriers, whereas the channel $U_1$ shown in FIG. 2 contains only 10 subcarriers. Therefore, the channel $U_0$ can be transmitted at more than twice the transmission rate of the channel $U_1$. On the border of each channel $U_0$, $U_1 \ldots U_9$, a single subcarrier having zero power is placed as a guard band 2 to minimize interference to subcarriers placed in the adjacent frequency band or to fulfill certain spectrum masks. If interference from the neighboring band is small, the guard band 2 need not to be provided, whereas, if the interference is excessive, a plurality of guard bands 2 can be provided.

The subcarriers 1 are generated by orthogonal frequency division multiplex (OFDM) processing. As shown in FIG. 3, W(f) indicates a wave form indicating an energy on the frequency axis and B(Hz) indicates the distance between two adjacent subcarriers. The OFDM processing provides for a multi-subcarrier-system, wherein the number of channels which can be multiplexed is not limited by interference from the other channels and can be freely determined depending on the bandwidth to be allocated. By changing the number of subcarriers to be allocated to the different channels, it is possible to change the transmission rate or to achieve a variable transmission rate. The subcarriers between the respective channels can be easily separated by means of a filter, thereby making it possible to prevent deterioration of S/N characteristics. Since OFDM processing is used for multi-subcarrier modulation, a guard band S is not necessarily needed between different channels, thereby achieving very high spectral efficiency. Further, because fast Fourier transformation can be utilized, the necessary processing can be rapid and small.

The number of channels in each group of channels can be varied, as shown in FIG. 4, in which a group of six channels $U_0$, $U_1 \ldots U_5$ is shown. In the OFDM/TDMA-system, the number of channels in a group can be varied within the system frequency band depending on information to be transferred.

In the known and standardized GSM-System, a type of single carrier frequency modulation called GMSK is used. The frequency channels are constant and the spacing between adjacent frequency channels is 200 kHz. The number of FDMA-channels is 124 and time division multiple access (TDMA) is used to support the number of parallel connections. The TDMA scheme in the GSM-System is 8 GSM-timeslots within one time frame. The GSM-timeslot length is 576.9 $\mu$s (15/26 ms), as is shown in FIG. 5. As can be seen in FIG. 5, the transmitted GSM-timeslots are not fully occupied by the transmitted burst to reduce interference from adjacent GSM-timeslots if the system is not perfectly synchronized. The guard period is 8.25 bits, which corresponds to 30.5 $\mu$s. The guard period is divided in two parts, wherein one of the parts is located at the beginning of the GSM time slot, and the other part is located at the end of the GSM-timeslot.

A GSM time frame consists of 8 GSM time slots and has therefore a length of 4615.4 $\mu$s, as is shown in FIG. 6. The GSM-system supports slow frequency hopping, which is explained in FIG. 6. The shown GSM-timeslot 3 is a receiving timeslot. According to the time division duplex (TDD)-system of the GSM-system, a corresponding transmission GSM-timeslot 4 is transmitted some timeslots later. Further on, the GSM-system makes use of the frequency division duplex (FDD)-system with 45 MHz between uplink and downlink, so that the transmission GSM-timeslot 4 is transmitted in the corresponding uplink frequency band, when the receiving GSM-timeslot 3 had been sent in the downlink frequency band, or vice versa. The next succeeding receiving GSM-timeslot 5 is of course transmitted in the same uplink or downlink frequency band as the preceding GSM-timeslot 3, but in a different frequency channel, according to the slow frequency hopping. The frequency hopping improves, together with the interleaving procedure, the transmission of the signals in view of the frequency and interference diversity. The usual interleaving depth in the GSM-system is 36.923 ms corresponding to 8×8 GSM-timeslots.

OBJECTS OF THE INVENTION

An object of the present invention is to provide a technique for transmitting signals on the basis of the OFDM/TDMA-system, where in the signals can be transmitted in a GSM-system.

SUMMARY OF THE INVENTION

Signals transmitted on the basis of a OFDM/TDMA-system by allocating a plurality of subcarriers, which are orthogonal to each other, to a variable number of channels, each channel containing a variable number of subcarriers depending on the information to be transmitted.

For transmission in a GSM-system having a constant number of predetermined GSM-frequency channels and a constant number of predetermined GSM-timeslots grouped in GSM-frames, the number of subcarriers allocated to each of the GSM-frequency channels is such that a multiple of one resulting OFDM/TDMA-timeslot matches with one or a multiple of one GSM-timeslot.

The number of subcarriers to be allocated to one GSM-frequency channel preferably is chosen so that several OFDM/TDMA-timeslots are mapped into one GSM-timeslot, or several OFDM/TDMA-timeslots are mapped into several GSM-timeslots, e.g. into eight GSM-timeslots (one GSM-frame). In the OFDM/TDMA-system, the transformation of one or a plurality of the subcarriers into the time domain results in an OFDM/TDMA-time burst. According to the present invention, one OFDM/TDMA timeslot contains essentially one OFDM/TDMA-time burst.

An important consequence of the mapping of the OFDM/TDMA-timeslots into the GSM-timeslots that the same interleaving depth as in a standard GSM-system can be obtained. A standard GSM-interleaving depth is 8×8 GSM-timeslots (approximately 36.923 ms). In the present invention, one or more OFDM/TDMA-timeslots (e.g. two, four, . . . ) are mapped into one GSM-timeslot. Therefore, the information units to be transmitted according to the system of the present invention can be smaller than in the standard GSM-system. This is advantageous in view of the interleaving depth. If, for example, two OFDM/TDMA-timeslots are mapped into one GSM-timeslot, and 8 OFDM/TDMA-timeslots form one frame (8-TDMA), an interleaving depth of 8 frames (same as GSM) results in a total interleaving delay of 18.461 ms, which is half of the corresponding total interleaving delay of 36.923 ms in the GSM-system. Therefore, the transmission of information in a system according to the present invention can have a smaller overall delay with the same interleaving (frequency and interference diversity). An interleaving depth of 16 frames (approximately 36.923 ms) results in the same overall delay as in the standard GSM-system, but is much more reliable in view of transmission problems (time-, frequency- and interference diversity). For the transmission of speech signals, usually a smaller interleaving delay is desired due to the real time requirements. For example, for the transmission of speech signals interleaving depths smaller than 40 ms and short time-frames (4–10 ms) are advantageous. For the transmission of data signals, the real time requirements are not so important, so that a longer interleaving depth can be chosen to improve the data transmission reliability.

Advantageously, the signals to be transmitted according to the present invention are interleaved with a total interleaving delay corresponding to 8×8 GSM-timeslots. Alternatively, the signals to be transmitted according to the present invention may be interleaved with a total interleaving delay corresponding to 4×8 GSM-timeslots.

In the transmission technique according to the present invention, allocating the subcarriers is brought about by generating a clock, producing the number of subcarriers according to the clock, transforming the subcarriers into time range bursts, and generating the OFDM/TDMA-timeslots by adding a guard time, a ramp time and an adaptation guard time to each of the time range bursts.

BRIEF DESCRIPTION OF THE DRAWINGS

In the following detailed description, the present invention is explained by means of preferred embodiments relating to the respective drawings, in which.

DETAILED DESCRIPTION

Figure 1:
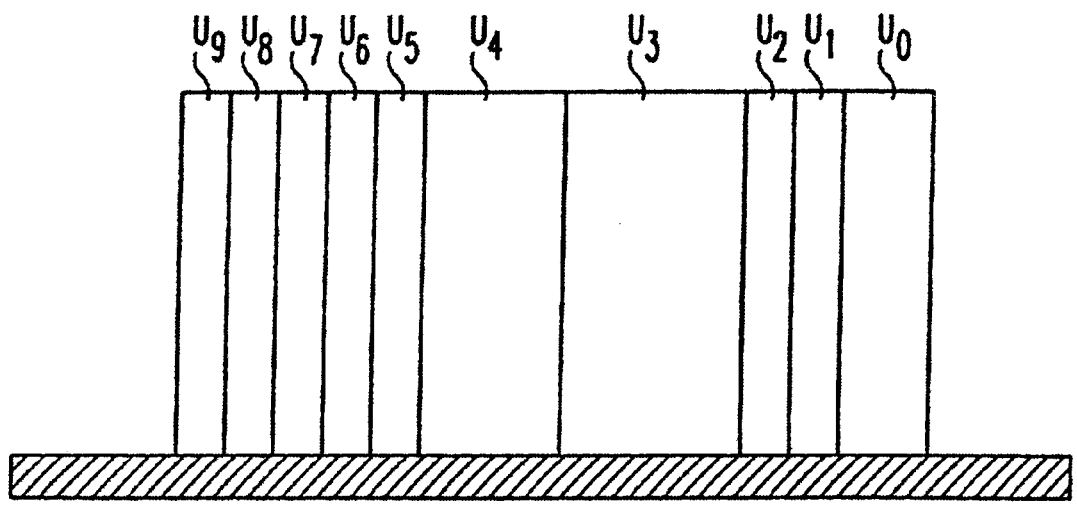
FIG. 1 shows a first group of channels of an OFDM/TDMA-system having variable sizes.
Figure 2:
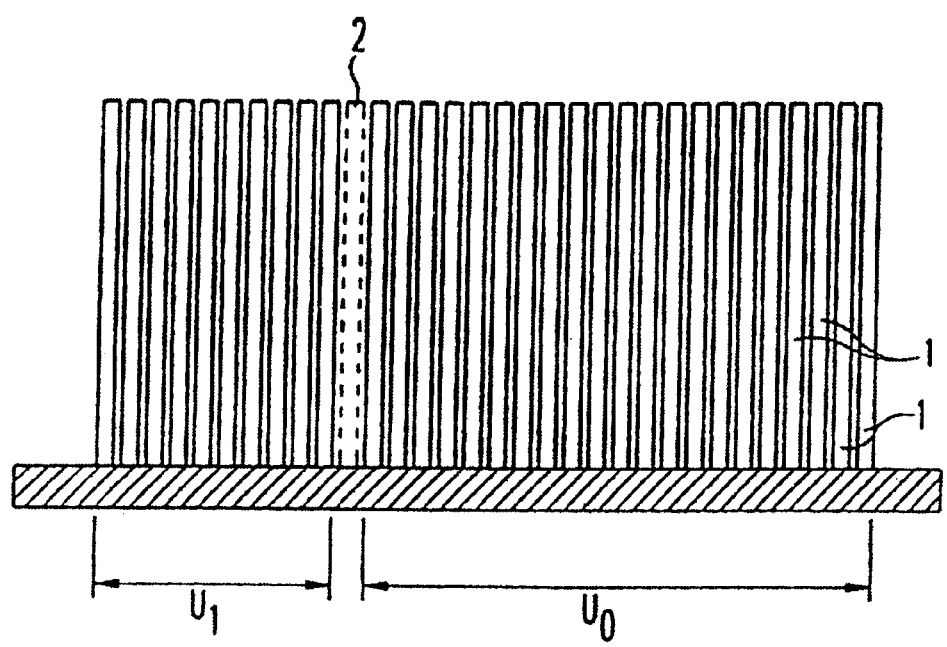
FIG. 2 shows two of the channels shown in FIG. 1 in more detail to explain the variable number of subcarriers in each channel.
Figure 3:
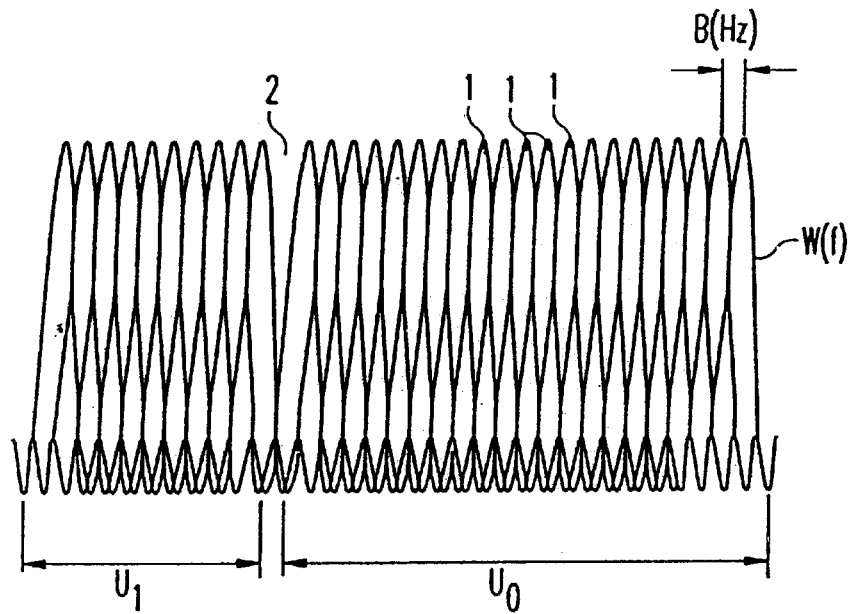
FIG. 3 shows the wave form of the subcarriers in the two channels shown in FIG. 2 in more detail.
Figure 4:
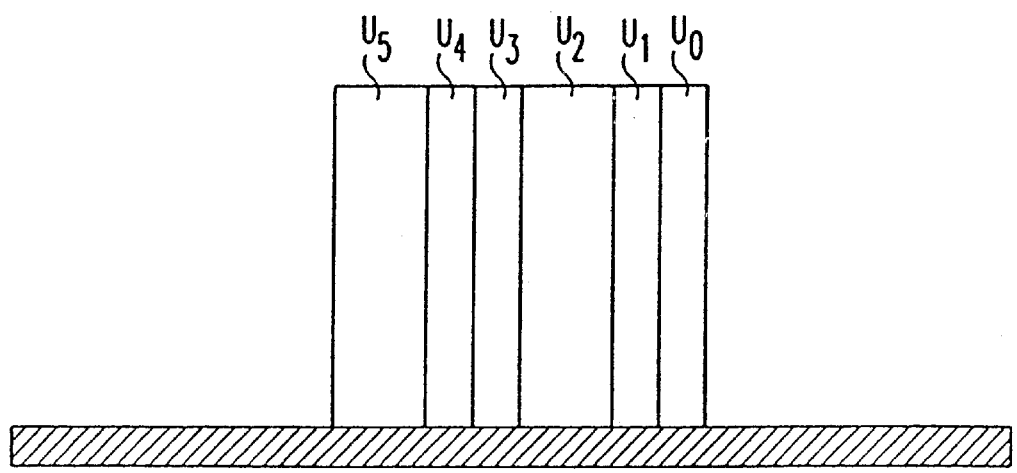
FIG. 4 shows a second group of channels different from the group shown in FIG. 1 to explain the variable group size in an OFDM/TDMA-system.
Figure 5:
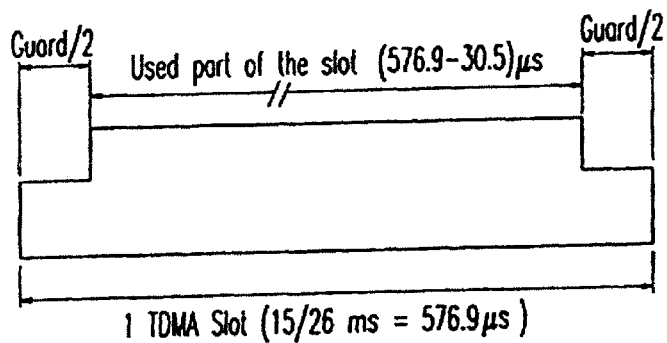
FIG. 5 shows the structure of a standard GSM-timeslot.
Figure 6:
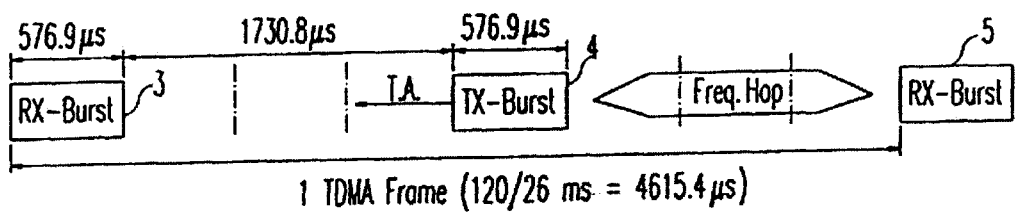
FIG. 6 shows the structure of a standard GSM-frame to explain the principle of TDD and FDD in a standard GSM-System.
Figure 7:
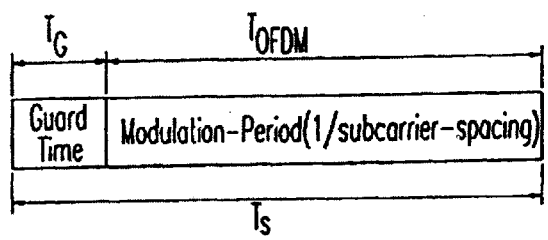
FIG. 7 shows the general structure of an OFDM/TDMA-timeslot.

According to the present invention, a number of subcarriers of an OFDM/TDMA-system is allocated to each GSM-frequency channel so that a multiple of one resulting OFDM/TDMA-timeslot matches with one or a multiple of one GSM-timeslot. The spacing between two adjacent GSM-frequency channels is 200 kHz, and the length of a GSM-timeslot is 15/26 ms. According to the present invention, one GSM-frequency channel is divided into a number of subcarriers. The number of subcarriers is chosen, so that a multiple of one resulting OFDM/TDMA-timeslot fits well in one or a multiple of one GSM-timeslot. The transformation of one subcarrier from the frequency domain into the time domain results in an OFDM/TDMA-time burst, which builds the largest part of the resulting OFDM/TDMA-timeslot. In FIG. 7, the basic structure of an OFDM/TDMA-timeslot is shown as containing an OFDM/TDMA-time burst, whereby the length of the OFDM/TDMA-timeburst $T_{OFDM}$ corresponds to the effective Modulation Period and depends on the subcarrier-spacing (1/subcarrier-spacing). The subcarrier spacing depends on the number of subcarriers allocated to one GSM-frequency channel of 200 kHz. A guard time TG (or pre-guard time) is disposed in advance of the OFDM/TDMA-time burst $T_{OFDM}$.

Figure 8:
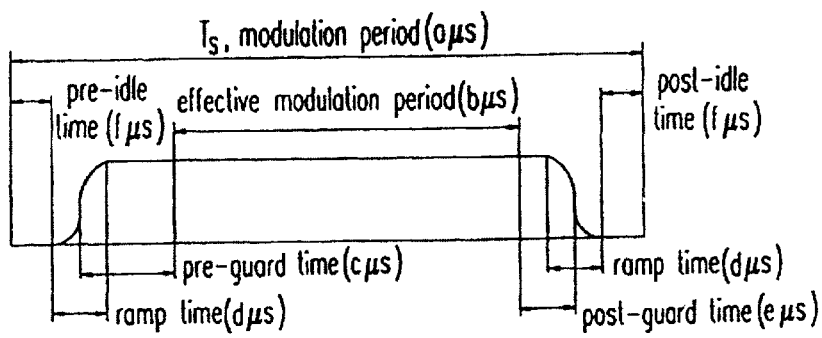
FIG. 8 shows the structure of an OFDM/TDMA-timeslot in more detail.

In FIG. 8, the detailed structure of an OFDM/TDMA-timeslot is shown. The length of the OFDM/TDMA-timeslot corresponds to the modulation period and has a length of a $\mu$s. After the transformation of the subcarriers into the time domain, whereby the OFDM/TDMA-timebursts are produced, a guard time consisting of the pre-guard time of length c $\mu$s and a post-guard time is of length e $\mu$s is added to the OFDM-TDMA-timebursts. The OFDM/TDMA-timebursts correspond to the effective modulation period and have a length b $\mu$s. Then, before transmitting, the ramp of the time domain signal is shaped according to a raised cosine function, as shown in FIG. 8, to reduce spurious emissions. As can be seen In FIG. 8, the ramp time in the front part and the back part of the OFDM/TDMA-timeslot, respectively, has a length d $\mu$s and overlaps partially with the pre-guard time and the post-guard time, respectively. The length of the post-guard time can be o $\mu$s. At the beginning of the OFDM/TDMA-timeslot there is located a pre-idle time in advance of the ramp time and at the end of the OFDM/TDMA-timeslot there is located a post-idle time behind the ramp time. The length of each of the pre-idle time and the post-idle time is f $\mu$s. Therefore, the resulting OFDM/TDMA-timeslot is composed of the OFDM/TDMA-timeburst (effective modulation period), the guard time consisting of the pre-guard time and the post-guard time, the ramp times and the pre-idle time and the post-idle time. The length b of the OFDM/TDMA-timeburst depends on the subcarrier spacing ($b=1/f_{SCS}$), where $f_{SCS}$ is the subcarrier in Hz. According to the present invention, the length a of one OFDM/TDMA-timeslot can for example correspond to 1, ½, ⅓ or ¼ GSM-timeslot.

Figure 9:
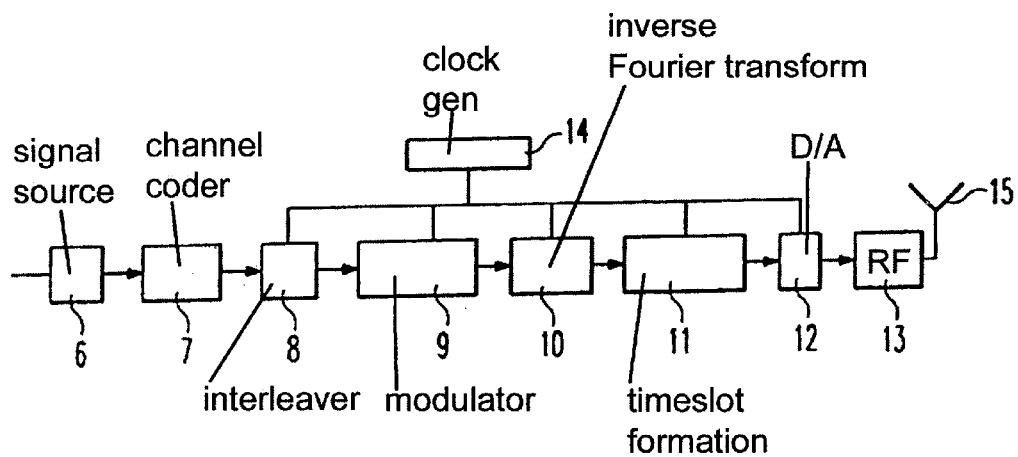
FIG. 9 shows the scheme of a transmission apparatus according to the present invention.

In FIG. 9, the basic scheme of a transmission apparatus according to the present invention is shown. Signals 6 to be transmitted are fed into a channel coder 7. The channel coded signals are fed into an interleaver 8, where they are interleaved according to a chosen interleaving depth, for example 8×8 OFDM/TDMA-frames or 16×8 OFDM/TDMA-frames. The interleaved signals are led into a modulator 9, in which OFDM processing is conducted to produce a chosen number of subcarriers. The subcarriers are transformed in an inverse discrete fourier transformation unit 10 into the time domain. In a timeslot formation unit 11, the time domain bursts are provided with a guard time $T_G$, and the time bursts are shaped, for example, with a raised cosine function. The OFDM/TDMA-timeslots are then converted in a D/A-converter 12 from digital into analog signals and then upconverted in a RF-converter 13. The thus processed signals are then transmitted by an antenna 15. A clock generator 14 provides the interleaver 8, the modulator 9, the inverse discrete fourier transformation unit 10 and the timeslot formation unit 11 with the necessary clock signals. The clock generator 14 can contain a switch to change the clock depending on the required transmission system. For example, the clock generator 14 could, controlled by the switch, provide the modulator 9 with different clock signals to produce different numbers of subcarriers.

Figure 10:
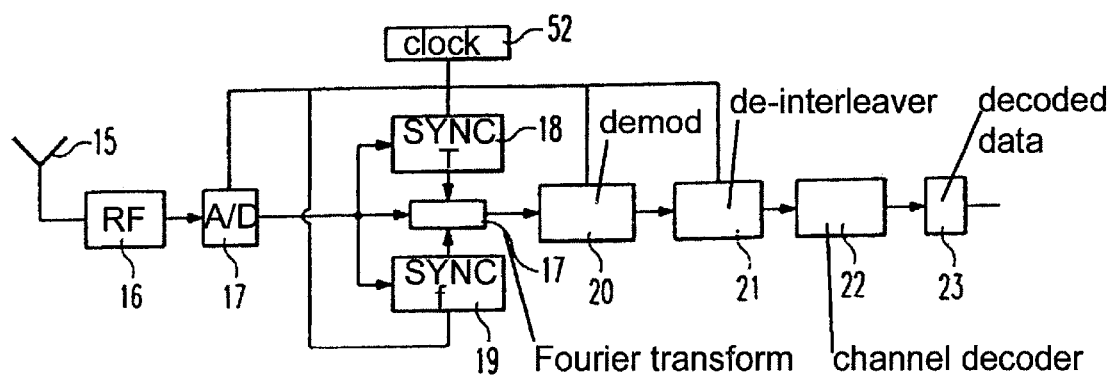
FIG. 10 shows the scheme of a receiver apparatus according to the present invention.

In FIG. 10, a basic scheme of a receiving apparatus according to the present invention is shown. An antenna 15 receives transmitted signals, which are downconverted in a RF-down-converter 16. Then, the downconverted signals are digitalized in an A/D converter 17. The thus converted signals are transformed in a discrete fourier transformation unit 17 into the frequency range, whereby the discrete fourier transformation unit 17 is time and frequency synchronized by a time synchronizer 18 and a frequency synchronizer 19. The frequency domain signals are demodulated in a demodulator 20 and then de-interleaved in a de-interleaver 21. The de-interleaved signals are then channel decoded in a channel decoder 22. The channel decoded data 23 can then be further processed as required. The time synchronizer 18, the frequency synchronizer 19, discrete fourier transformation unit 17, the demodulator 20 and the de-interleaver 21 are provided with the necessary clock signals by a clock generator 52.

In the following, advantageous combinations of subcarrier numbers and numbers of OFDM/TDMA-timeslots to be mapped into one or more GSM-timeslots are presented as preferred solutions for the backward compatibility of an OFDM/TDMA-system in a GSM-system. Thereby, the used frequency slot serving as a basis for the backward compatibility is 200 kHz, the frequency channel band of the GSM-system. The number of the subcarriers is chosen to assure a backwards compatibility of an OFDM/TDMA-system to the GSM-timeslot structure or GSM-frame structure. Thereby, even a multiple of one GSM-timeslot or one GSM-frame are subdivided into proper designed OFDM/TDMA-timeslots resulting from the number of subcarriers. According to the present invention it is further ensured that an interleaving utilizing cross-interleaving to enhance the time-frequency diversity and the GSM-backward compatibility is possible. Also, realistic delays, for example for speech signals, and relaxed interleaving delay constraints, for example for the transmission of data signals, are considered. The following preferred embodiments are identified as the best solutions for an OFDM/TDMA-system to be GSM-backward compatible in channel allocation (frequency) and time structure (GSM-timeslots or GSM-frames).

In the following embodiment it is proposed to map 1, 2, 3 or 4 OFDM/TDMA-timeslots into one GSM-timeslot. Thereby, the pre-guard time and post-guard time are optional but advantageous.

1st Embodiment

In a 1st embodiment, the total number of subcarriers is 48, whereby one or more subcarriers on the borders can be left unmodulated to reduce interference to adjacent frequency slots. The resulting subcarrier spacing is 200 kHz/48=4.166 Hz, which leads to an OFDM/TDMA-time burst $T_{OFDM}$ of 48/200 kHz=240 μs. The symbol duration (240 μs) is therefore very long compared to the GSM-symbol duration (range of μs), which has the advantage of avoiding intersymbol interference due to the radio channel delay profile.

The guard time (pre-guard time and post-guard time) in the first embodiment is set to 30 μs, whereby it has to be noted that the guard time has to be set according to the expected channel delay profile (multipath environment). The ramp time is set to 10 to 20 μs, so that the total OFDM/TDMA-timeslot $T_s$ has a length of 280 to 290 μs. This fits very well into ½ of the basic GSM-timeslot of 576 923 μs. Therefore, in the 1st embodiment, two OFDM/TDMA-timeslots are mapped into one GSM-timeslot with an adaptation time guard, if necessary.

The basic clock is 240 μs/64=3.75 μs. The guard time (pre- and post guard time) can be set to 30 μs (pre-guard: 22.5 μs=6 samples, post-guard: 7.5 μs=2 samples) and the ramp time can be set to 15.0 μs (=4 samples) which leads to a total symbol time of (250 μs/64)*(64+6+2+4)=285 μs.

The preferred interleaving scheme in the first embodiment is based on an OFDM/TDMA-frame length of 2.3077 ms., i.e. 8 OFDM/TDMA-timeslots $T_s$. The preferred interleaving depth is 8×8 OFDM/TDMA-frames (total interleaving delay 18.461) ms) or 16×8 OFDM/TDMA-frames (total interleaving delay 36.923 ms). Also an interleaving depth of 12×8 OFDM/TDMA frames is possible (total interleaving delay 27.692 ms). An interleaving depth of 8×8 OFDM/TDMA-frames therefore allows a data transmission with the same interleaver design and performance as in standard GSM, whereas an interleaving depth of 16*8 OFDM/TDMA-frames allows a data transmission with the same interleaving delay as in the standard GSM system, but with much better performance (interleaving gain).

2nd Embodiment

In the 2nd embodiment, the total number of subcarriers is chosen to be 32, wherein one or more subcarriers at the borders can be left unmodulated to reduce interference to adjacent frequency slots. The subcarrier spacing is 200 kHz/32=6.25 kHz, which leads to an OFDM/TDMA-burst of 1/6.25 kHz=160 μs. The guard time (pre- and post guard time) can be set to 20 μs and the ramp time can be set to 10.0 μs, which leads to a total OFDM/TDMA-timeslot of 190 μs. 3 OFDM/TDMA-timeslots $T_s$ are mapped into one GSM-timeslot with an adaptation time guard. In other words, one OFDM/TDMA-timeslot $T_s$ is mapped into ⅓ of a GSM-timeslot.

The basic clock is set to 160 μs/32=5 μs. To be more precise, the guard time (pre- and post guard time) can be set to 20 μs (pre-guard: 15.0 μs=3 samples, post-guard: 5 μs=1 sample) and the ramp time can be set to 10.0 μs (=2 samples) which leads to a total symbol time of (160 μs/32)*(32+3+1+2)=190 μs.

The preferred interleaving scheme for the 2nd embodiment is based on one OFDM/TDMA frame containing 6

OFDM/TDMA-timeslots mapped into 2 GSM-timeslots. The preferred interleaving depth is 4×4 OFDM/TDMA-frames (total interleaving delay 18,461 ms) or 8×4 OFDM/TDMA-frames (total interleaving delay 36.923 ms). Also, the interleaving depth can be set to 6×4 OFDM/TDMA-frames (total interleaving delay 27.692 ms).

3rd Embodiment

In the 3rd embodiment, the total number of subcarriers is chosen to be 24, wherein one or more subcarriers at the borders can be left unmodulated to reduce interference to adjacent frequency slots. The subcarrier spacing is 200 kHz/24=8.33 kHz, which leads to an OFDM/TDMA-burst of 1/8.33 kHz=120 $\mu$s. The guard time (pre- and post guard time) can be set to 15 $\mu$s and the ramp time can be set to 9 $\mu$s, which leads to a total OFDM/TDMA-timeslot of 144 $\mu$s. 4 OFDM/TDMA-timeslots $T_s$ are mapped into one GSM-timeslot with an adaptation time guard. The scheme according to the 3rd embodiment is very advantageous for fast varying channel environments. In other words, one OFDM/TDMA-timeslot $T_s$ is mapped into ¼ of one GSM-timeslot.

The basic clock is set to 120 $\mu$s/32=3.75 $\mu$s. to be more precise, the guard time (pre- and post guard time) can be set to 15 $\mu$s (pre-guard: 11.25 $\mu$s=3 samples, post-guard: 3.75 $\mu$s=1 sample) and the ramp time can be set to 7.5 $\mu$s (=2 samples) which leads to a total symbol time of (120 $\mu$s/32) *(32+3+1+2)=142.5 $\mu$s.

The preferred interleaving scheme for the 3rd embodiment is based on one OFDM/TDMA-frame containing 4 OFDM/TDMA-timeslots mapped into 1 GSM-timeslot. The preferred interleaving depth is 4×4 OFDM/TDMA-frames (total interleaving delay 18.461 ms) or 8×4 OFDM/TDMA-frames (total interleaving delay 36.923 ms). Also, the interleaving depths can be set to 6×4 OFDM/TDMA-frames (total interleaving delay 27.692 ms).

4th Embodiment

In the 4th embodiment, the total number of subcarriers is chosen to be 104, wherein one or more subcarriers at the borders can be left unmodulated to reduce interference to adjacent frequency slots. The subcarrier spacing is 200 kHz/104=1.923 kHz, which leads to an OFDM/TDMA-burst of 1/1.923 kHz=520 $\mu$s. The guard time (pre- and post guard time) can be set to 25 $\mu$s and the ramp time can be set to 15 $\mu$s, which leads to a total OFDM/TDMA-timeslot of 560 $\mu$s. One OFDM/TDMA-timeslot is mapped into one GSM timeslot with an adaptation guard of 17 $\mu$s.

The basic clock is set to 520 $\mu$s/128=4.0625 $\mu$s. To be more precise, the guard time (pre- and post guard time) can be set to 28.4375 $\mu$s (pre-guard: 20.3125 $\mu$s=5 samples, post-guard: 8.125 $\mu$s=2 sample) and the ramp time can be set to 12.1875 $\mu$s (=3 samples) which leads to a total symbol time of (520 $\mu$s/128)*(128+5+2+3)=560 625 $\mu$s.

The interleaving scheme is the same as for GSM (8 frames within the 8 TDMA).

In all the above-described embodiments, the interleaving scheme can be dynamically changed for various data rates. For applications with less severe delay requirements, e.g. for data services or picture and video services, the interleaver schemes of the above-described embodiments can be enhanced to dramatically improve the time and frequency diversity effect. However, to ensure GSM-compatibility, 2, 4 and 8 GSM-timeslots for the mapping scheme utilizing 1 GSM-timeslot are preferred. For the mapping schemes using one GSM-frame as a basic OFDM/TDMA-frame, multiples of 1, 2 and 4 are preferred.

The above presented compatibility schemes allow the combined usage of OFDM/TDMA- and GSM-systems with a minimum adaptation effort. Also, a GSM- to OFDM/TDMA-handover and vice versa can be easily performed. The interoperation of the two systems is described in the following example referring to FIGS. 11 and 12.

Figure 11:
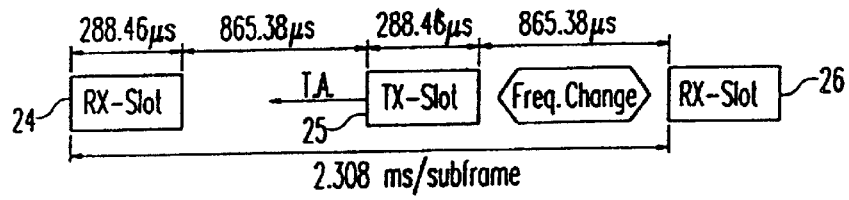
FIG. 11 shows the basic structure of an OFDM/TDMA-frame being compatible with a GSM-system.

In FIG. 11, a principle OFDM/TDMA-frame consisting of 8 OFDM/TDMA-timeslots is mapped into half that number of GSM-timeslots, which results in a total of 16 OFDM/TDMA-timeslots being mapped into 8 GSM-timeslots. In other words, 2 OFDM/TDMA-timeslots are mapped into 1 GSM-timeslot. In FIG. 11, a subframe of 2,308 ms containing 8 OFDM/TDMA-timeslots is shown. An OFDM/TDMA-timeslot 24 is a timeslot for receiving data, the OFDM/TDMA-timeslot 25 is a timeslot for transmitting data, and the OFDM/TDMA-timeslot 26 is the next corresponding timeslot for receiving data in the next subframe. Between two timeslots 25 and 26, a slow frequency hopping can occur. The subframe length of 2.308 ms allows 16 subframes in 36.923 ms. This is important for the interleaving means used according to the present invention. The interleaving means spreads the data bits over 16 subframes, which is robust against transmission errors using time, frequency and interference diversity, and the overall interleaving delay is still only 36.92 ms. As explained above, a small interleaving delay is important for speech connections due to the real time requirement. The interleaving of the 16 OFDM/TDMA-subframes corresponds exactly to the interleaving depth of 8×8 GSM-frames having a length of 36.923 ms.

Figure 12:
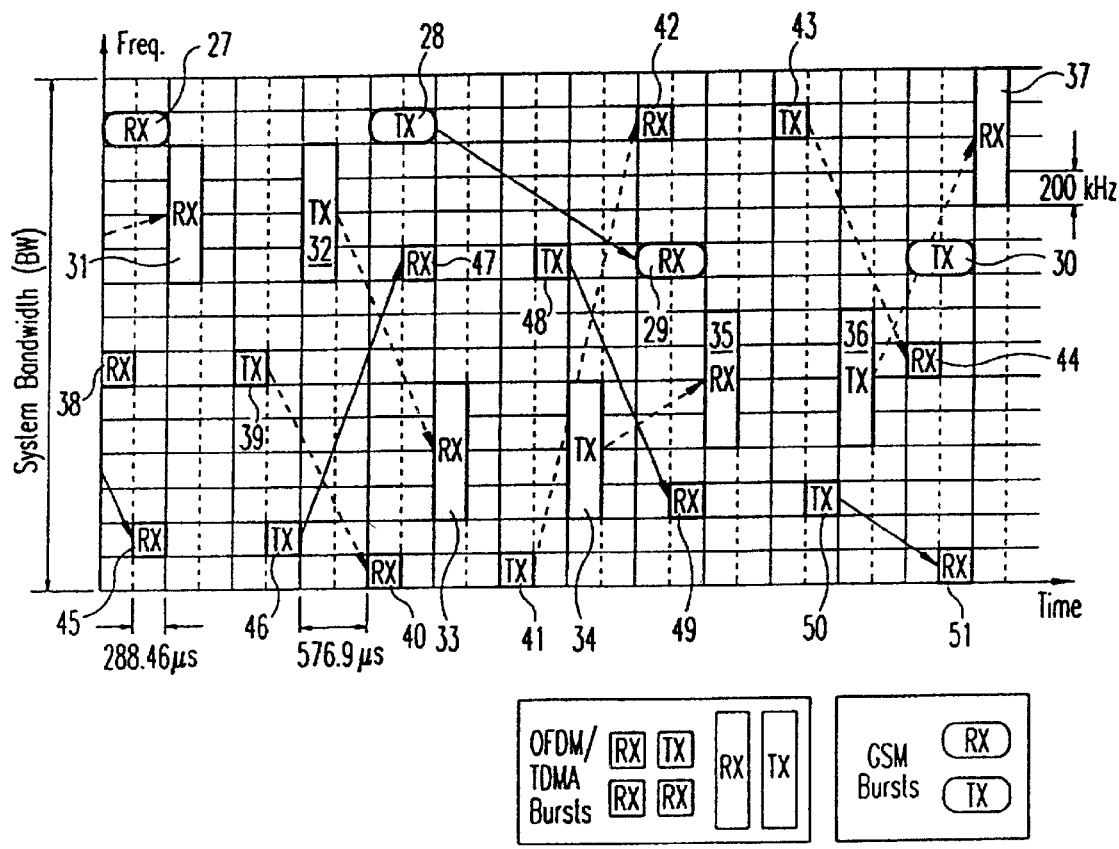
FIG. 12 shows a time-frequency grid in a common OFDM/TDMA- and GSM-system according to the present invention.

With the parameters explained above, the OFDM/TDMA-system can coexist with the existing GSM-system and is backward compatible in timeslots, frequency and interleaving. Furthermore, the systems can coexist in a common system with a common allocated frequency range. One advantage of the present invention is that multiple timeslots and/or multiple frequency slots can be allocated to one user to enhance the data rate. In FIG. 12, a time-frequency grid in a common OFDM/TDMA- and GSM-system is shown. FIG. 12 shows the time/frequency slot allocation for 3 OFDM/TDMA users and 1 GSM user. The OFDM/TDMA users use schemes as explained in relation to FIG. 11 with one OFDM/TDMA-timeslot mapped into one half of a GSM-timeslot. Two of the OFDM/TDMA-users transmit data with a normal data rate within the GSM-frequency channel of 200 kHz, whereas the third OFDM/TDMA user transmits data with a high data rate within 4 GSM frequency channels.

The GSM-user uses a receiving GSM-timeslot 27, a transmitting GSM-timeslot 28, a receiving GSM-timeslot 29 and a transmitting GSM-timeslot 30. Between the transmitting GSM-timeslot 28 and the receiving GSM-timeslot 29, a slow frequency hopping takes place, and between the respective receiving and transmitting GSM-timeslots, a TDMA-process is carried out. The first OFDM/TDMA-user transmitting data with a normal data rate uses a first receiving OFDM/TDMA-timeslot 38, the transmitting OFDM/TDMA-timeslot 39, a receiving OFDM/TDMA-timeslot 40, a transmitting OFDM/TDMA-timeslot 41, a receiving OFDM/TDMA-timeslot 42, a transmitting OFDM/TDMA-timeslot 43 and a receiving OFDM/TDMA-timeslot 44. Between the respective receiving and transmitting OFDM/TDMA-timeslots, a TDMA-process is carried out, whereas between the respective transmitting timeslots and the next receiving timeslot, a slow frequency hopping takes place. The same is true for a second user, which uses a receiving OFDM/TDMA-timeslot 45, a transmitting OFDM/TDMA-timeslot 46, a receiving OFDM/TDMA timeslot 47, a transmitting OFDM/TDMA-timeslot 48, a receiving OFDM/TDMA-timeslot 49, a transmitting OFDM/TDMA-timeslot 50 and a receiving OFDM/TDMA timeslot 51. The third OFDM/TDMA user transmitting data with a high data rate uses a receiving OFDM/TDMA-timeslot 31, a transmitting OFDM/TDMA-timeslot 32, a receiving OFDM/TDMA-timeslot 33, a transmitting OFDM/TDMA-timeslot 34, a receiving OFDM/TDMA-timeslot 35, a transmitting OFDM/TDMA-timeslot 36 and a receiving OFDM/TDMA-timeslot 37. Also for the third OFDM/TDMA-user, TDMA-processing is carried out between respective receiving and transmitting timeslots, and slow frequency hopping takes place between respective transmitting and receiving timeslots.

Figure 13:
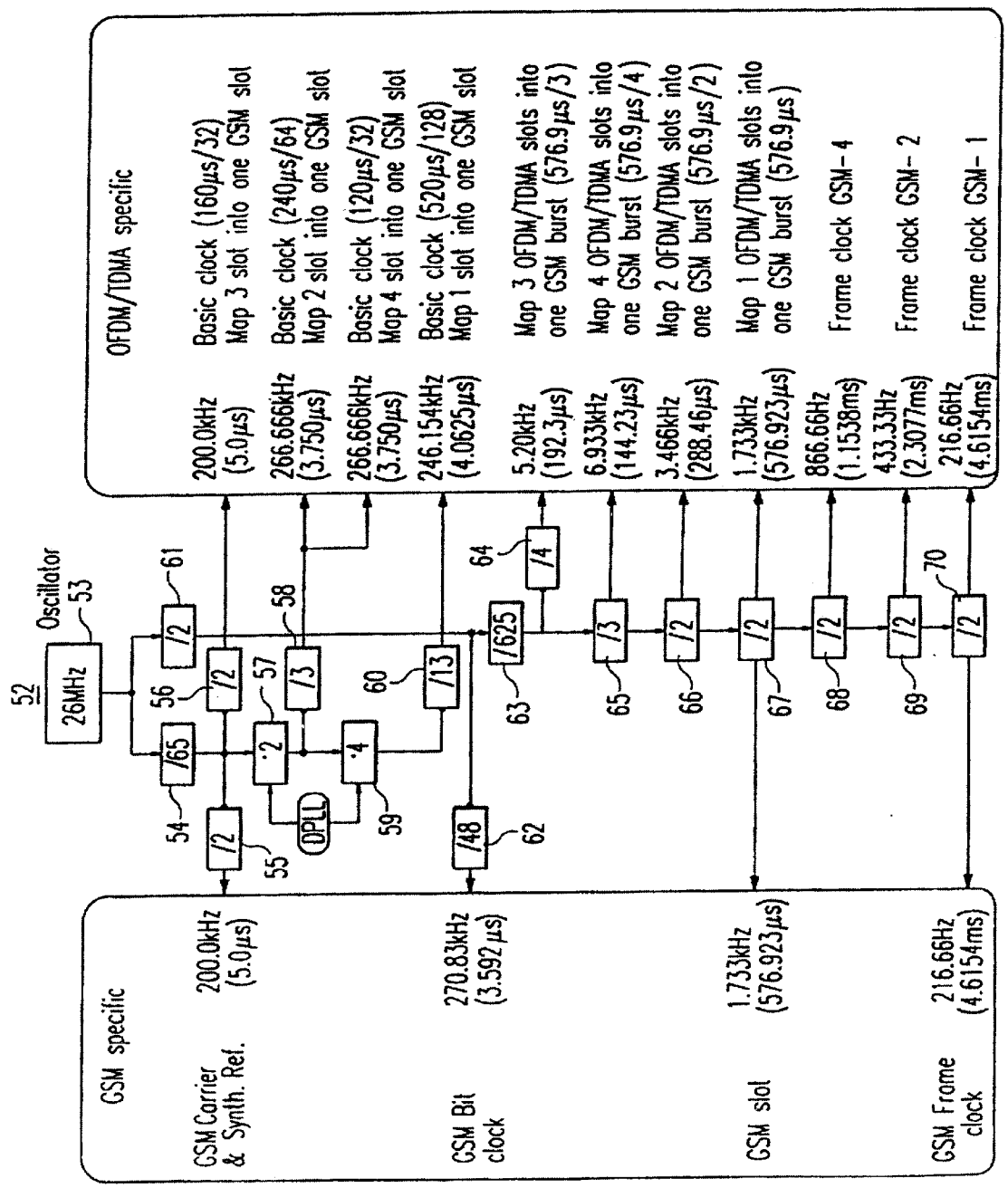
FIG. 13 shows a clock generating means for an OFDM/TDMA-system according to the present invention.

In FIG. 13, a clock generating means 52 for a transmission and/or receiving apparatus is shown which is capable of producing the necessary clocks both for a GSM-system and an OFDM/TDMA-system according to the present invention. The clock generating means 52 is based on the use of a common reference clock of 26 MHz, which is used in the GSM-system. The clock generating means 52 comprises an oscillator 53 which generates a 26 MHz clock. The clock generating means 52 further comprises a number of dividers and/or multipliers 54 to 70, which are selectively chosen for the used OFDM/TDMA-system. In FIG. 13, all possible dividers and multipliers are shown to produce the necessary clocks for all the embodiments described in the present application. However, the elements not necessary for the respectively chosen embodiment can be omitted.

The output of the oscillator 53 is divided by 65 in a divider 54 and further divided by 2 in respective dividers 55 and 56 to produce a clock of 200 kHz for the GSM-system and the OFDM/TDMA-system, respectively. In the OFDM/TDMA-system, the 200 kHz clock is the basic clock for the mapping of 3 OFDM/TDMA timeslots into one GSM timeslot. In the GSM-system, the 200 kHz clock is the carrier and synthesizer reference clock.

The output of the divider 54 is multiplied by 2 in a multiplier 57 and further divided by 3 in a divider 58 to generate a clock of 266.666 kHz which is the basic clock in the OFDM/TDMA-system for the mapping of one OFDM/TDMA-timeslot into one GSM timeslot and for the mapping of 4 OFDM/TDMA timeslots into one GSM timeslot. The output of the multiplier 57 is further multiplied by 4 in a multiplier 59 and then divided by 13 in a divider 60 to produce a clock of 246.154 kHz which is the basic clock in the OFDM/TDMA system for the mapping of one OFDM/TDMA timeslot in one GSM timeslot.

The output of the oscillator 53 (26 MHz) is divided by 2 in a divider 61 and further divided by 48 in a divider 62 to produce a clock of 270.83 kHz, which is the bit clock in the GSM-system. The output of the divider 61 is further divided by 625 in a divider 63 and then divided by 4 in a divider 64 to produce a clock of 5.20 kHz, which is the necessary clock in the OFDM/TDMA-system for the mapping. Of 3 OFDM/TDMA timeslots into one GSM timeslots.

The output of the divider 63 is further divided by 3 in a divider 65 to produce a clock of 6.933 kHz, which is a necessary clock for the OFDM/TDMA-system for the mapping of 4 OFDM/TDMA timeslots into one GSM timeslot. The output of the divider 65 is further divided by 2 in a divider 66 to produce a clock of 3.466 kHz, which is a necessary clock in the OFDM/TDMA-system for the mapping of 2 OFDM/TDMA timeslots into one GSM timeslot. The output of the divider 66 is further divided by 2 in a divider 67 to produce a clock of 1.733 kHz, which is a necessary clock in the OFDM/TDMA-system for the mapping of one OFDM/TDMA timeslot into one GSM timeslot. The clock of 1.733 kHz is also a necessary clock in the GSM-system for the GSM timeslots.

The output of the divider 67 is further divided by 2 in a divider 68 to produce a clock of 866.66 Hz, which is the frame clock in an OFDM/TDMA-system, in which the operation mode is based on frames of a duration of 1.1538 ms (which is exactly ¼ of the GSM frame length). The output of the divider 68 is further divided by 2 in a divider 69 to produce a clock of 433.33 Hz, which is the frame clock in an OFDM/TDMA-system, in which the operation Mode is based on frames of a duration of 2.3077 ms (which is exactly ½ of the GSM frame length). The output of the divider 69 is further divided by 2 in a divider 70 to produce a clock of 216.66 Hz, which is the frame clock in an OFDM/TDMA-system in which the operation mode is based on frames of a duration of 4.6154 ms (which is exactly one GSM frame length). The clock of 216.66 Hz is also the frame clock in the GSM-system.

Using the proposed division rates and clock multipliers all necessary clock signals for generating the necessary OFDM/TDMA-timeslots and bursts can be easily generated. A system not using all the proposed OFDM/TDMA-structures can be implemented omitting the not-used branches in the clock tree illustrated in FIG. 13. All the parameters (subcarrier number, subcarrier spacing, mapping into GSM-timeslots, FFT resolution) have been specified to be easily GSM compatible and can be derived from a common GSM clock oscillator.

The present invention is directed to a burst (time-domain) and frequency slot allocation of an OFDM/TDMA-system, which is as far as possible backward compatible to the existing GSM-burst and frequency structure. The parameters of the OFDM/TDMA-system are chosen to support flexible band with services in the mobile environment.

What is claimed is:

1. A method for transmitting signals on the basis of an OFDM/TDMA-system, comprising the steps of:
   allocating a plurality of subcarriers which are orthogonal to each other to a variable number of channels, each channel containing a variable number of subcarriers depending on information to be transmitted in said signals, and
   transmitting said signals in a GSM-system having a constant number of predetermined GSM-frequency-channels and a constant number of predetermined GSM-timeslots grouped in GSM-frames, wherein the number of said subcarriers that are allocated to each of said GSM-frequency-channels is such that a multiple of one resulting OFDM/TDMA-timeslot matches with one or a multiple of one GSM-timeslot.

2. The method according to claim 1, wherein said signals to be transmitted are interleaved with a total interleaving delay corresponding to 8×8 GSM-timeslots.

3. The method according to claim 1, wherein said signals to be transmitted are interleaved with a total interleaving delay corresponding to 4×8 GSM-timeslots.

4. The method according to claim 1, wherein the subcarriers are allocated by generating a clock, modulating a signal to be transmitted and producing said number of subcarriers according to said clock, transforming said subcarriers into time range bursts, and generating said OFDM/TDMA-timeslots by adding a guard time, a ramp time and an adaptation guard time to each of said time range bursts.

5. The method according to claim 1 wherein 48 of said subcarriers are allocated to each of said GSM-frequency channels, so that 2 OFDM/TDMA-timeslots match with 1 GSM-timeslot.

6. The method according to claim 1 wherein 32 of said subcarriers are allocated to each of said GSM-frequency channels, so that 3 OFDM/TDMA-timeslots match with 1 GSM-timeslot.

7. The method according to claim 1 wherein 24 of said subcarriers are allocated to each of said GSM-frequency channels, so that 4 OFDM/TDMA-timeslot match with 1 GSM-timeslot.

8. The method according to claim 1 wherein 104 of said subcarriers are allocated to each of said GSM-frequency channels, so that 1 OFDM/TDMA-timeslot matches with 1 GSM-timeslot.

9. Transmission apparatus for transmitting signals on the basis of an OFDM/TDMA-system, comprising an allocator for allocating a plurality of subcarriers which are orthogonal to each other to a variable number of channels, each channel containing a variable number of subcarriers depending on information to be transmitted in said signals, wherein for the transmission of said signals in a GSM-system having a constant number of predetermined GSM-frequency-channels and a constant number of predetermined GSM-timeslots grouped in GSM-frames, said allocator allocates a number of said subcarriers to each of said GSM-frequency-channels such that a multiple of one resulting OFDM/TDMA-timeslot matches with one or a multiple of one GSM-timeslot, and a transmitter for transmitting said signals.

10. Transmission apparatus according to claim 9, further including an interleaver for interleaving said signals to be transmitted with a total interleaving delay corresponding to 8×8 GSM-timeslots.

11. Transmission method according to claim 9, further including an interleaver for interleaving said signals to be transmitted with a total interleaving delay corresponding to 4×8 GSM-timeslots.

12. Transmission apparatus according to claim 9, wherein said allocator comprises a clock generator for generating a clock, a modulator for modulating a signal to be transmitted and producing said number of subcarriers according to said clock, a transformation unit for transforming said subcarriers into time range bursts, and a timeslot generator for generating said OFDM/TDMA-timeslots by adding a guard time, a ramp time and an adaptation guard time to each of said time range bursts.

13. Transmission apparatus according to claim 9, wherein said allocator allocates 48 of said subcarriers to each of said GSM-frequency channels, so that 2 OFDM/TDMA-timeslots match with 1 GSM-timeslot.

14. Transmission apparatus according to claim 9, wherein said allocator allocates 32 of said subcarriers to each of said GSM-frequency channels, so that 3 OFDM/TDMA-timeslots match with 1 GSM-timeslot.

15. Transmission apparatus according to claim 9, wherein said allocator allocates 24 of said subcarriers to each of said GSM-frequency channels, so that 4 OFDM/TDMA-timeslots match with 1 GSM-timeslot.

16. Transmission apparatus according to claim 9, wherein said allocator allocates 104 of said subcarriers to each of said GSM-frequency channels, so that 1 OFDM/TDMA-timeslot matches with 1 GSM-timeslot.

17. A transmission system including a transmission apparatus according to claim 9 and a receiving apparatus for receiving said signals transmitted by said transmission apparatus.

18. A transmission system according to claim 17, wherein said receiving apparatus comprises a receiver for receiving said signals, synchronization means for time and frequency synchronization as a function of said received signals, transformation means for transforming said OFDM/TDMA-timeslots into said subcarriers, and a demodulator for demodulating said subcarriers.

* * * * *